(12) United States Patent
Kiknadze et al.

(10) Patent No.: US 7,331,752 B2
(45) Date of Patent: Feb. 19, 2008

(54) METHOD OF CONVERSION OF CONTINUOUS MEDIUM FLOW ENERGY AND DEVICE FOR CONVERSION OF CONTINUOUS MEDIUM FLOW ENERGY

(75) Inventors: Gennady Iraklievich Kiknadze, Moskau (RU); Ivan Alexandrovich Gachechiladze, Moskau (RU)

(73) Assignee: Inventors Network GmbH, Sigmaringen (DE)

( * ) Notice: Subject to any disclaimer, the term of this patent is extended or adjusted under 35 U.S.C. 154(b) by 319 days.

(21) Appl. No.: 10/482,901

(22) PCT Filed: Jul. 5, 2002

(86) PCT No.: PCT/EP02/07497

§ 371 (c)(1),
(2), (4) Date: May 18, 2004

(87) PCT Pub. No.: WO03/004868

PCT Pub. Date: Jan. 16, 2003

(65) Prior Publication Data

US 2004/0240984 A1    Dec. 2, 2004

(30) Foreign Application Priority Data

Jul. 5, 2001  (EP)  ................................. 01116275

(51) Int. Cl.
*F03B 3/18*  (2006.01)
*F03D 3/04*  (2006.01)

(52) U.S. Cl. ............................ 415/1; 415/3.1; 415/4.2; 415/4.3; 415/4.4; 415/4.5; 415/13; 415/184; 415/185; 415/191; 415/193; 415/909; 415/914; 244/204; 244/207; 244/208; 244/130; 137/809

(58) Field of Classification Search .......... 415/2.1–4.5, 415/10, 13, 26, 36, 42, 44–45, 48, 183–185, 415/191, 193, 208.1, 208.2, 210.1, 905–909, 415/914; 290/42–44, 53–55; 244/200.1, 244/201–203, 204.1, 205–209, 130; 137/809; 138/37, 39

See application file for complete search history.

(56) References Cited

U.S. PATENT DOCUMENTS 1,519,447 A * 12/1924 Fortier-Beaulieu .......... 415/4.4

(Continued)

FOREIGN PATENT DOCUMENTS

DE         463711 A * 8/1927 ................. 415/909

(Continued)

OTHER PUBLICATIONS

Yen, James T., "*Tornado-Type Wind Energy System*", Proceedings of the Intersociety Energy Conversion Engineering Conference, IECEC 1975 Record, p. 987 and p. 993, left column, paragraph D.

*Primary Examiner*—Christopher Verdier
(74) *Attorney, Agent, or Firm*—Ohlandt, Greeley, Ruggiero & Perle, L.L.P.

(57) ABSTRACT

A device and method for conversion of the energy of medium flows are provided. The proposed device and method ensure suppression of the vortex streams in the flow on the leg of its motion along the radially converging trajectories and concentration of the flow energy, which is expressed by the increase of its velocity and decrease of the summary area of the cross section of the converging trajectories. As the flow runs along the first system of helical trajectories the following takes place: the harmful secondary vortex jets continue attenuating, the degree of concentration of the flow energy increases and velocity components form in the flow, which correspond to natural vortex streams, for instance, tornadoes, whirlpools. The formation of a vortex as the flow runs along the first system of trajectories results in a concentrated steady vortex flow with an effective concentration of the pressure differential into kinetic energy of the motion of particles and into a rotational moment, which are required for complete transfer of the energy to the rotational moment and energy receiver.

10 Claims, 6 Drawing Sheets

U.S. PATENT DOCUMENTS 3,771,589 A * 11/1973 Lage ................... 165/109.1
4,018,543 A *  4/1977 Carson et al. ........... 415/208.2
4,452,046 A    6/1984 Valentin
4,452,562 A *  6/1984 Hsu .................... 415/208.1
4,516,747 A *  5/1985 Lurz ................... 244/204
4,932,612 A *  6/1990 Blackwelder et al. ...... 244/207
4,935,639 A    6/1990 Yeh
5,346,745 A *  9/1994 Bandyopadhyay .......... 244/130
5,362,179 A * 11/1994 Sirovich et al. .......... 138/37
5,386,955 A *  2/1995 Savill ................. 244/200
5,463,257 A * 10/1995 Yea ................... 290/55
6,006,823 A * 12/1999 Kiknadze et al. ......... 165/133
6,119,987 A *  9/2000 Kiknadze et al. ......... 244/204

FOREIGN PATENT DOCUMENTS

| | | |
|---|---|---|
| DE | 33 01 885 | 7/1984 |
| EP | 0 679 812 | 11/1995 |
| EP | 0 839 309 | 5/1998 |
| GB | 2263525 A * | 7/1993 |
| JP | 59025091 | 2/1984 |
| RU | 2 059 881 | 5/1996 |
| WO | WO 92/14981 A1 * | 9/1992 |
| WO | WO 94/00342 A1 * | 1/1994 |
| WO | PCT/EP96/03200 | 7/1996 |
| WO | WO 97/04280 A1 * | 2/1997 |

OTHER PUBLICATIONS

Dick, E., "*Power Limits for Wind Energy Concentrator Systems*", Wind Engineering, Multi-Science Publishing Co., Brentwood, Essex, GB, vol. 10, No. 2, 1986, pp. 109-113.

* cited by examiner

METHOD OF CONVERSION OF CONTINUOUS MEDIUM FLOW ENERGY AND DEVICE FOR CONVERSION OF CONTINUOUS MEDIUM FLOW ENERGY

BACKGROUND OF THE INVENTION

1. Field of the Invention

The invention relates to power engineering and, in particular, to the methods and devices for conversion of the continuous medium flow energy into mechanical energy.

This invention may be used in wind and hydraulic driven power engineering in various hydraulic and gas dynamic systems, for instance, when the motion of liquids, gas, two-phase or multicomponent media is used for mechanical energy generation.

The invention can be most successfully used in wind-driven electric power plants, in hydroelectric power plants, arranged in river beds (without dams), in tide-driven hydroelectric power plants, as well as when the energy of thermoinduced flows is utilised including sun-heated thermoinduced flows.

2. Description of Related Art

Known are methods of concentration of the wind flow power by placing into the flow devices in the form of a convergent-divergent reflector arranged coaxially with the direction of flow of the wind to increase its velocity and hence the power of the flow directed onto the power generating units of the above indicated electric plants.

What is common for such methods is that the profitability of their utilisation in wind-driven power generating systems of different type depends on the average velocity V of the flow.

For wind-driven electric power plants this velocity is V=8 to 12 m/s. In addition, during the motion of the wind along the path of the device realising this or that energy conversion method as well as in the course of the interaction between the continuous medium flow and the elements of the said device, harmful secondary flows in the shape of vortices are generated, and some energy of the flow is spent on their formation; due to this fact, the flow is subject to an additional dynamic resistance which reduces the efficiency of conversion of its energy.

In other words, since harmful secondary vortex flows are generated in the flow against the background of the main flow during the interaction between the flow and the elements of the power generating plant or when the flow is moving along the path of the device, the efficiency of conversion was limited by the loss of energy on the formation of the vortices.

There is a prior art method for the conversion of the continuous medium flow energy into mechanical energy according to which a rotational moment is imparted to the flow, and this moment is directed into the inlet chamber and into a system of channels; a reduced pressure is created in the flow and this ensures an inflow of the medium from the external space and a concentration of the power in the formed flow; then the flow energy accumulated in this way is converted by means of the rotary-action mechanism (Ragwalla, A. A., Hsu, C. T., "Power Coefficient of Tornado-Type Wind Turbines". Journal Energy, 1983, V. 7, No. 66, p. 735-737; Hsu, Ñ. Ó., Ide, H., "Performance of Tornado-Type Wind Turbines with Radial Supply". Journal Energy, V. 7, No. 6, 1983, p. 452-453).

The devices which realise this method are called TWES (Tornado Wind Energy Systems) and they essentially are towers inside of which a tornado-like vortex flow is generated. As it was already mentioned, this flow originates due to the inflow of air inside the tower through one or a multiplicity of slots forming an arbitrary, but permanent for the given structure, angle with the local radius of the tower.

The slots in the tower are open on the windward side and closed on the leeward side. Upon passing through these slots the wind acquires a tangential velocity component, and this involves the origination of a vortex flow inside the tower. A reduced pressure zone is formed in the core of such flow, and this results in the suction of additional masses of air inside the tower through the tower bottom, installed on a special device designed for creating a draught.

The authors of the works cited and other researchers (see, for instance, the works of So, R. M. C., "On Vortex Wind Power". Journal of Fluids Engineering, 1978, V. 100, p. 79-82) were guided by a wrong conception that the velocity field in the TWES is characterised by a distribution which is a characteristic of the Burgers vortex (Burgers, J. M., "A Mathematical Model Illustrating the Theory of Turbulence". Advanced Appl. Median., 1948, V. 1, p. 157-199). However, realisation of this method in the corresponding devices testifies to rather large losses, caused by the above-described absence of conditions, which are intended to ensure smooth joining of the stream-lines in the jets, flowing through the slots into the tornado tower, with the stream-lines in the formed tornado-like flow.

The disadvantage of the given energy conversion method and of the devices, based on this method, is that in this case the motion of the flow in the form of separate jets along the channels or volumes, into which this flow is directed, is characterised by nonstationary stream-lines, by their sharp bends and, as a consequence, by the formation of harmful secondary vortex flows involving energy losses by the flows and a low degree of efficiency of the device, by means of which the said method is realised.

From the hydrodynamic point of view the employed flow and the transferred continuous medium flow are forced to form in their inside not only those stream-lines, which are required for the realisation of the method, but also a large number of nonstationary parasite trajectories. This results from the disagreement in the formation of the flow according to the said method accompanied by the natural conditions of smooth vortex-free flow of continuous media, and the formation of tornadoes under natural conditions may serve as an example.

There is another prior art method of energy conversion of a continuous medium flow comprising that the flow to be converted is directed into an internal axissymmetric volume along two systems of trajectories converging towards the axis of symmetry of this volume; the first of the said systems forms a vortex flow just in front of the zone of conversion of the rotational moment and mechanical energy, ensures concentration of the mechanical energy and rotational moment in the axissymmetric volume, as well as the further conversion of the mechanical energy and rotational moment in the same volume, whereas the second system of trajectories forms a flow with a reduced pressure, the said pressure reduction ensuring evacuation of the continuous medium, which flows out of the mechanical energy and rotational moment conversion zone; the first system of trajectories fills first the space area which is limited by the two surfaces of revolution and then assumes the form of helices.

A device is known for conversion of the energy of natural flows; this device includes a converging chamber, two systems of channels arranged symmetrically with regard to the central axis of the device, the first of the systems being provided with axes in the form of helices, a turbine with a fairing, smoothly conjugated to the central internal fairing, an electric generator connected to the turbine by means of the central shaft, passing through the central fairing, and a supporting structure.

The above method and device for its realisation have the following disadvantages: there is no axial swirling in the first system of trajectories and, therefore, the first system creates a rather weak reduced pressure in the area, delivered to which the flow is running out of the energy conversion zone; there is no description of the shape of the first system of channels, which could ensure high efficiency of energy conversion of the continuous medium flow in the said device.

In RU 20 59 881 G. I. Kiknadze, I. A. Gachechiladze and V. G. Oleinikov are proposing a method of conversion of continuous medium flow energy and a device for a realisation thereof wherein generation of harmful secondary vortices is reduced to a maximum to avoid any energy losses based on these harmful secondary vortices. In general it is proposed to organize a flow or flows of the streaming medium in a manner avoiding generation of any additional vortices not contributing to a conversion of energy to a maximum extend.

BRIEF SUMMARY OF THE INVENTION

An object of this invention is to develop a method and a device for the conversion of a continuous medium flow and the energy of its motion in such a way that the said device and method form such trajectories of the motion, which ensure an increased conversion of the flow energy into mechanical energy.

In contradiction to RU 20 59 881 the inventors of this invention surprisingly found out that generation of additional vortices may contribute to an increased generation of conversion of continuous medium flow energy into mechanical energy. The inventors found out that vortice, especially secondary vortices may be divided into at least two classes of vortices, i.e. vortices defined according to the invention as harmful or negative vortices being harmful or having a negative influence for energy conversion and vortices contributing to an energy conversion being defined according to the invention as contributing or positive vortices.

Harmful or negative vortices tend to influence the conversion efficiency in a negative manner as these are not limited to a certain area or predefined local areas and are often centres of disordered flow regimes.

Contributing or positive vortices are vortices decreasing $F_r$ (inertial force) drag resistance or influencing a medium flow in a manner that said energy conversion is supported or increased. Often this type of vortices assists in generating an improved or smoothened flow or smoothened flow regimes which then is a basis for reduced losses during energy conversion or is restricted to boundary layers which then avoids an introduction of additional vortices in to a main flow.

Even more surprisingly the inventors found out that vortices generated according to methods as disclosed in EP 92 911 873.5 being the European regional phase of PCT/RU92/00106 and in EP 96 927 047.9 being the European regional phase of PCT/EP96/03200 are apt to generate contributing vortices without a generation of essentially any harmful or negative vortices.

Even more surprisingly the inventors found out that vortices generated according to a teaching of EP 92 911 873.5 being the European regional phase of PCT/RU92/00106 and EP 96 927 047.9 being the European regional phase of PCT/EP96/03200 have a cleaning effect i.e. tend to suck in and delete harmful vortices and, thus, contribute to a prevention of generating harmful vortices.

Accordingly, it is a further object of the invention to convert energy at a reduced formation of harmful secondary flows and hydraulic resistance losses during the interaction between the flow and the elements of the device realising this method, as well as a reduction of the energy conversion zone size.

Besides, it was supposed to organise the motion of the used flow in such a way as to ensure evacuation (sucking off) of the waste flow, which has transferred part of its energy to an appropriate energy receiver.

The set problem is solved in the following way: a method of conversion of continuous medium flow energy and a device for its realisation according to RU 20 59 881 is improved in that surface areas of said device are used for generation of vortices as known from EP 92 911 873.5 being the European regional phase of PCT/RU92/00106 and EP 96 927 047.9 being the European regional phase of PCT/EP96/03200.

To that end it is described first how said method and device according to RU 20 59 881 are realized and then briefly how to incorporate surface areas incorporated according to EP 92 911 873.5 being the European regional phase of PCT/RU92/00106 and EP 96 927 047.9 being the European regional phase of PCT/EP96/03200.

According to RU 20 59 881 harmful secondary vortices are minimized and in the proposed method of conversion of the continuous medium flow energy the flow to be converted is directed into the internal axissymmetric volume along two systems of trajectories converging towards the axis of symmetry of the said value; the first system forms a vortex flow just in front of the zone of conversion of the rotational moment and mechanical energy, it concentrates the mechanical energy and rotational moment in the axissymmetric volume and ensures further conversion of the mechanical energy and rotational moment in the same volume, whereas the second system of trajectories forms a flow with a reduced pressure thus ensuring evacuation of the continuous medium flowing out of the mechanical energy and rotational moment conversion zone; the first system of trajectories will at first fill that space area, which is limited by the two surfaces of revolution, and then it will assume the form of helices; in the second system of trajectories the flow is swirled up, whereas the first system trajectories adjoining the surfaces of revolution are first rendered a shape in accordance with the dependencies given below:

$$Z_1(r) = C_1\left[\frac{r-R_0}{NR_0-R_0} - \frac{1}{2\pi}\sin\frac{2\pi(r-R_0)}{NR_0-R_0}\right],$$

$$Z_2(r) = C_2/r^2 + C_3\left[\frac{r-R}{NR_0-R} - \frac{1}{2\pi}\sin\frac{2\pi(r-R)}{NR_0-R_0}\right],$$

$$R_0 \le r \le NR_0$$

$$C_1 \approx -\frac{C_2}{2R^2},\ C_3 \approx \frac{C_2}{R^2},$$

and then the trajectories of the first system of trajectories are rendered a shape of helices in accordance with the dependencies:

$$Z_{1i}(r) = C_{4i}/r^2 + C_{5i}\left[\frac{r-R}{NR_0-R} - \frac{1}{2\pi}\sin\frac{2\pi(r-R)}{NR_0-R_0}\right],$$

$$\varphi_{1i}(r) = \varphi_{10i} + \frac{v_{\varphi 1}(R)}{2v_{r1}(R)}\frac{R^2}{R_0^2}\left[\frac{R_0^2}{r^2} - 1 + \frac{(r-R)^2}{2R_0(R_0-R)} - \frac{1}{2} + \frac{R}{2R_0}\right],$$

$$R \le r \le R_0$$

$$0 < C_{4i} < C_2,\ C_{5i} = C_3 C_{4i}/C_2,$$

The second system of trajectories results from the interaction between the directed flow and the concave surface of revolution, and in this case the trajectories of the second system of trajectories, which are adjacent to this surface of revolution, are rendered the . shape in accordance with the dependencies given below:

$$Z_3(r) = C_6/r^2 + C_7\left[\frac{r-R}{NR_0-R} - \frac{1}{2\pi}\sin\frac{2\pi(r-R)}{NR_0-R}\right], \quad R_0 \le r \le NR_0$$

$$C_6 \ge C_2, \quad C_7 \ge C_3,$$

and then the trajectories of the second system of trajectories are rendered the shape of helices in compliance with the dependencies:

$$\left.\begin{aligned}Z_{2i}(r) &= C_{8i}/r^2 + C_{9i}\left[\frac{r-R}{NR_0-R} - \frac{1}{2\pi}\sin\frac{2\pi(r-R)}{NR_0-R}\right], \\ \varphi_{2i}(r) &= \varphi_{20i} + \frac{v_{\varphi 2}(R)}{2v_{r2}(R)}\frac{R^2}{R_0^2}\left[\frac{\frac{R_0^2}{r^2}-1+\frac{(r-R)^2}{2R_0(R_0-R)}-}{\frac{1}{2}+\frac{R}{2R_0}}\right],\end{aligned}\right\} R \le r \le R_0$$

$$C_{8i} > C_8, \quad C_{9i} > C_7,$$

where:

r, φ, z—cylindrical coordinates, in which axis Z coincides with the axis of the axissymmetric volume, in which the vortex flow is generated;

$R_0$—distance from the axis of the axissymmetric volume to the beginning of the helical trajectories;

$$R \approx \frac{1}{5}R_0$$

—radius of the axissymmetric volume in the zone where the formed vortex flow runs out of the said volume;

$NR_0$—distance from the axis of axissymmetric volume to the beginning of the convergent surface of revolution, $N \ge 2$;

$C_2$—constant value connected with height Z and radius R of the axissymmetric volume:

$$C_2 \approx \frac{ZR^2}{2};$$

$C_1$, $C_3$—constants, expressed through constants $C_2$;

$C_{4i}$, $C_{5i}$—constants, which vary within the above indicated ranges;

$\varphi_{10i}$, $\varphi_{20i}$—values of angle φ at the beginning of the i-th helical trajectory of the first and second systems accordingly;

$$\frac{v_{\varphi 1}(R)}{v_{r1}(R)}, \frac{v_{\varphi 2}(R)}{v_{r2}(R)}$$

—relations of rotational and radial velocity components at radius R for the first and second systems of helical trajectories accordingly;

$C_6$, $C_7$—constants, which vary within the above indicated ranges;

$C_{8i} < ZR^2$—constant, which does not exceed the product of height Z of the axissymmetric volume, in which the vortex flow is generated, by the square of its radius R;

$C_{9i} \le Z$—constant, which is less than the height of the axissymmetric volume, in which the vortex flow is generated or is of the same order with the height.

The proposed method ensures suppression of the vortex streams in the flow on the leg of its motion along the radially converging trajectories and concentration of the flow energy, which is expressed by the increase of its velocity and decrease of the summary area of the cross section of the converging trajectories. As the flow runs along the first system of helical trajectories the following takes place: the harmful secondary vortex jets continue attenuating, the degree of concentration of the flow energy increases and velocity components form in the flow, which correspond to natural vortex streams, for instance, tornadoes, whirlpools. The formation of a vortex as the flow runs along the first system of trajectories results in a concentrated steady vortex flow with an effective concentration of the pressure differential into kinetic energy of the motion of particles and into a rotational moment, which are required for complete transfer of the energy to the rotational moment and energy receiver.

As the flow moves along the second system of trajectories the harmful secondary vortex streams also attenuate and flow velocity components are generated, which correspond to natural vortex flows. In this case an intensive decrease of pressure takes place in the near-axial zone due to the acceleration of particles, due to the acquisition of a rotational velocity component by the particles, as well as due to the reduction of the hydraulic losses and to the high stability of the formed vortex flow, since these phenomena prevent the formation of harmful secondary vortex streams.

The steady vortex flow, formed after it passes through the first system of trajectories, is delivered into the rotational moment and energy conversion zone due to the interaction between the flow and the rotational moment and energy receiver. Changing its rotational moment, the flow influences by the moment of forces the moment and energy receiver thereby providing energy transfer to the receiver. At the said method of conversion of the formed continuous medium vortex flow energy the generation of harmful secondary vortex streams in the energy conversion zone is reduced to the minimum, the nonuniformity of the pressure fields decreases, additional mass inertial forces originate, which result from the rotation of the medium, and this facilitates maximum efficiency in the conversion of the flow energy.

The waste flow running out of the energy conversion zone enters the decreased pressure zone created by the rotating flow, formed as the flow runs through the second system of trajectories. In this case, the waste flow is intensively sucked away from the conversion zone and evacuated into the external space due to the reduced pressure and increased kinetic energy of the flow which runs through the second system of channels and also is delivered into the external space.

The motion of the initial flow along the convergent trajectories and through the two systems of trajectories is characterised by the smooth transition from the initial flow velocity field to the velocity field of the formed flow, small degree of vortex generation and efficient concentration of energy due to the choice of the shape of these trajectories, which involve formation of a vortex flow similar to natural vortex streams.

The latter circumstance implies the naturalness and stability of the streamlines in that sense that the flow, which starts moving along the said trajectories, has a tendency to continue such motion without the necessity of application of essential forces for keeping the flow running along the above-described trajectories.

Motion along such pathways is characterised by a stable balance of inertial forces and pressure gradients, and this results in the reduction of hydraulic losses on the formation of vortices and in a high concentration of the flow energy in the zone of its conversion.

The stated problem is also solved by the use of a device for conversion of the energy of natural flows; this device comprises a convergent-type chamber, two systems of channels arranged symmetrically with regard to the central shaft of the device; the first system is made with axes in the form of helices, a turbine with a fairing, smoothly conjugated to the central internal fairing, an electric generator connected to the turbine by means of the central shaft, passing through the central fairing, and a supporting structure; the second system of channels is made with axes in the form of helices, and in this case the inlet convergent-type chamber is formed by the shells of revolution set up in cylindrical coordinates in according with the following dependencies for the lower shell:

$$Z_1(r) = C_1 \left[ \frac{r - R_0}{NR_0 - R_0} - \frac{1}{2\pi} \sin \frac{2\pi(r - R_0)}{NR_0 - R_0} \right], \quad R_0 \leq r \leq NR_0$$

$$C_1 \approx -\frac{C_2}{2R^2},$$

for the upper shell:

$$Z_2(r) = C_2/r^2 + C_3 \left[ \frac{r - R}{NR_0 - R} - \frac{1}{2\pi} \sin \frac{2\pi(r - R)}{NR_0 - R} \right],$$

$$R_0 \leq r \leq NR_0,$$

$$C_2 \approx \frac{ZR^2}{2}, \quad C_3 \approx \frac{C_2}{R^2},$$

The upper shell of the convergent chamber serves simultaneously as the guide surface for part of the flow delivered into the second system of channels, whereas the spatial position of the channel axes of the first system of trajectories is set up in accordance with the dependencies:

$$Z_{1i}(r) = \frac{ZR^2(1 - 1/2)}{nr^2} + \frac{ZR(1 - 1/2)}{n} \left[ \frac{r - R_0}{NR_0 - R_0} - \frac{1}{2\pi} \sin \frac{2\pi(r - R_0)}{NR_0 - R_0} \right],$$

$$\varphi_{1j}(r) = \varphi_{10j} + \frac{v_{\varphi 1}(R)}{2v_{r1}(R)} \frac{R^2}{R_0^2} \left[ \frac{R_0^2}{r^2} - 1 + \frac{(r - R)^2}{2R_0(R_0 - R)} - \frac{1}{2} + \frac{R}{2R_0} \right],$$

$$R \leq r \leq R_0, S \leq 1, i = 1, 2, \ldots, n \quad j = 1, 2, \ldots, n_{\varphi 1}$$

and the spatial position of the channel axes of the second system of trajectories is set up by dependencies:

$$Z_{2i}(r) = \frac{ZR^2(1 - 1/2)}{nr^2} + \frac{SZ(1 - 1/2)}{n} \left[ \frac{r - R_0}{NR_0 - R} - \frac{1}{2\pi} \sin \frac{2\pi(r - R)}{NR_0 - R} \right],$$

$$\varphi_{2j}(r) = \varphi_{20j} + \frac{v_{\varphi 2}(R)}{2v_{r2}(R)} \frac{R^2}{R_0^2} \left[ \frac{R_0^2}{r^2} - 1 + \frac{(r - R)^2}{2R_0(R_0 - R)} - \frac{1}{2} + \frac{R}{2R_0} \right],$$

$$R \leq r \leq R_0, \quad i = n_1 + 1, n_1 + 2, \ldots, n, \quad j = 1, 2, \ldots, n_{\varphi 2}$$

where:
r, φ, Z—cylindrical coordinates with axis Z coinciding with the central axes of the device;
z—height of axissymmetric internal volume of the device
R—its radius in the zone of the outlet of the formed vortex flow;
$R_0 \approx 5R$—distance from the axis of symmetry of the device to the place of the flow inlet into the system of channels;
$NR_0$—distance from the axis of the axissymmetric volume to the beginning of the shells formed by the inlet convergent-type chamber, N 2;
i—index that gives numbers to the axes in the systems of channels, counting upward;
n—maximum value of index i,
j—index that gives numbers to the axes in the systems of channels in the order of rotation around the central shaft of the device;
$\varphi_{10j}, \varphi_{20j}$—values of angle φ at the beginning of the j-th helical trajectory of the first and second systems accordingly;
$n_i$—maximum value of index i for the first system;
n—maximum value of index i for the second system;

$$\frac{v_{\varphi 1}(R)}{v_{r1}(R)}, \frac{v_{\varphi 2}(R)}{v_{r2}(R)}$$

—relation between rotational and radial velocity components on radius R for the first and second systems of helical trajectories accordingly;
$n_{\varphi 1}, n_{\varphi 2}$—maximum values of index j for the first and second systems of channels accordingly.

The shape of the central internal fairing is described by the dependence:

$$Z_\mu = \frac{C_\mu}{r^2},$$

$$C_\mu = (1 - 4)10^{-4} ZR^2.$$

The systems of channels are provided with guide vanes, made as movable elements which automatically narrow the inlet into the first and second systems of channels, when the rate of flow exceeds the nominal value.

The electric generator is located in any zone of the device, either over the turbine or under the lower shell of the inlet convergent-type chamber.

The device is provided with a system of floating supports consisting of magnets which ensure longitudinal spacing of the device units, electromagnets with a control system, which serve to compensate lateral and longitudinal oscillations of the device rotating parts.

The device is also provided with a stabiliser of the number of revolutions and with a flywheel connected to the central shaft of the device.

The device is equipped with a thermal accumulator utilising the energy of the Sun or any other sources of heat; the accumulator is installed over the flywheel and serves for preheating and stimulation of upward flows of continuous medium; in this case the surface of the thermal accumulator directs the upward flow into the inlet convergent-type chamber in the form of preliminarily swirled jets of the continuous medium.

The supporting structure has at least three supporting points. The structure is rigidly connected to the surface of the inlet convergent-type chamber and it is provided with recesses for the installation and fixing of the mechanical systems of the device central shaft, magnetic supporting points and units of the device; the structure also ensures the required orientation of the entire device, its location on the surface of the ground, in pressure communication lines or in hydraulic channels.

The use of the indicated device ensures efficient conversion of the flow in the inlet convergent-type chamber due to the indicated profiles formed by the chamber shells; this conversion is expressed in the concentration of the streamlines of the flow entering the chamber, and in this case there is practically no formation of harmful secondary vortex streams, break-away or stagnation zones, and the flow is gradually applied to the first system of helical channels. If in the inlet chamber the turbulent flow contains considerable velocity pulsations (an increased turbulence level of the flow entering the device), then due to the selected shape of the inlet chamber shells the flow is quazilaminarised as it runs through the inlet chamber. The inlet chamber design in the form of two shells, which are symmetrical with regard to the device axis, permits the device to work at any direction of the oncoming flow. Thus, there is no necessity of orientation of the inlet chamber in the direction of the on-coming flow.

The continuous medium is directed into the second system of channels due to its interaction with the upper shell of the converging chamber serving as the guiding surface for this part of the flow. The indicated profile of the upper shell of the converging chamber ensures an increase of the rate of flow through the second system of channels and amplifies the evacuation of the waste flow onto the turbines, thus increasing the efficiency of operation of the device. The first system of channels serves for subsequent concentration of the flow velocity and kinetic energy. The choice of the channel axes of this system in accordance with the above-mentioned relations practically excludes the formation of harmful secondary flows in each of the channels and, in addition, a steady flow is formed after the convergence of the flows, running out of each channel of the first system of channels, and this steady flow has a minimum level of turbulence and ensures a high degree of concentration of the flow velocity.

Thus, the first system of channels forms a vortex flow and directs it into the zone at the turbine space inlet, ensuring the required rotational moment of the flow and concentrating the flow energy for its further conversion in the turbine.

In the turbine inter-vane space the incoming flow is divided into separate flows, which transmit their moment of momentum to the turbine vanes, dividing the flow.

The second system of channels also serves for the concentration of the velocity and kinetic energy of the flow running into it as a result of the interaction between the on-coming flow and the upper shell of the convergent chamber. The choice of the channel axes of the second system in accordance with the indicated dependencies ensures a reduction of the formation of harmful secondary vortices, thus facilitating efficient conversion of pressure into velocity, due to which the pressure strongly decreases as the flows from this system converge around and above the outflow area from the turbine.

The resulting decrease of the pressure in the outflow zone involves an increased rate of flow through the turbine; in addition, the effect of the velocity increase will promote dynamically the evacuation of the waste flow from the outflow zone.

The outcoming vortex flow, running from the device into the open space and possessing due to the second system of channels a residual vortex, interacts with the external flow moving around the device as in the event, when the device is used, for instance, as a wind-driven or hydraulically driven energy converter.

The combined effect of the flow concentration and its suction due to the outflow from the second system and interaction with the external flow results in an increased energy conversion efficiency due to the reduction of losses, taking away of the flow by suction, as well as by the said interaction; in this case the speed of turbine rotation increases and its dimensions decrease due to the concentration of the streamlines or concentration of the velocity. In addition, the range of utilisation of the working flows running at a small velocity will extend, since the concentration of the velocity of these flows involves an increase of the velocity in the zone of location of the turbine. The stability of the flow provided by profiling of the system of channels in accordance with the natural shapes of the motion of natural vortex flows, as well as the smoothness of the velocity and pressure fields in the formed jets ensure reliable operation of the turbine and of the entire device as a whole due to the reduction of the nonstationary load effects in the construction.

DETAILED DESCRIPTION OF PREFERRED EMBODIMENTS

Figure 1:
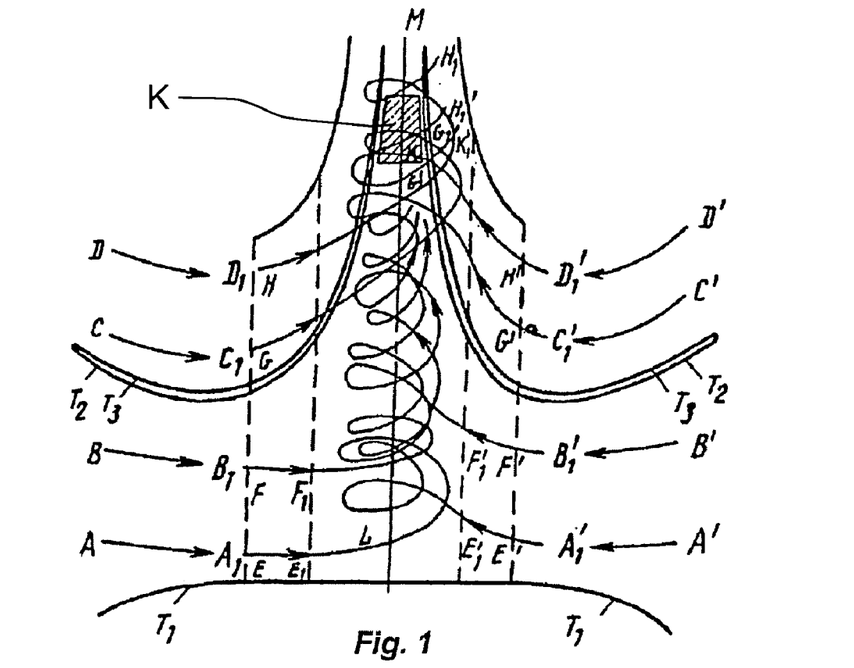
FIG. 1 is a diagram illustrating the proposed method of conversion of continuous medium flow energy into mechanical energy.

The proposed method of conversion of the energy of a turbulent continuous medium flow is realised, as indicated in FIG. 1, in the following way:

The formed flow is directed along the two systems of radially converging confuser trajectories into the internal axissymmetric volume; the first system of trajectories A-A1, B-B1, A'-A'1 and B'-B'1 fills at first the space area limited by the two surfaces of revolution $T_1$ and $T_2$, whereas the second system of trajectories C-C1, D-D1, C'-C'1 and D'-D'1 is formed as a result of the interaction between the directed flow and the concave surface of revolution $T_3$.

In the course of the flow motion the first system of trajectories is shaped as helical trajectories E-E1, F-F1, E'-E'1 and F-F'1; as the formed flow passes through this system, a vortex flow is generated from part of this flow just in front of the zone of conversion of the rotational moment and mechanical energy K, which are concentrated in the said flow due to merging of the jets in the process of their motion through the first system of trajectories A-A1, B-B1, A'-A'1, B'-B'1, E-E1, F-F1, E'-E'1 and F-F'1.

In the course of the flow motion, the second system of trajectories is subsequently rendered the shape of helical trajectories G-G1, H-H1, G'-G'1 and H'-H'1; as these trajectories pass through the system a vortex flow is also generated from part of the formed flow due to the merging of the jets in the process of their running through the second system of trajectories C-C1, D-D1, C'-C'1, D'-D'1, G-G1, H-H1, G'-G'1, H'-H'1; this vortex flow being characterised by a reduced pressure, which ensures ejection of the medium flowing out of its rotational moment and energy conversion zone.

The device for conversion of the continuous medium flow energy contains inlet converging chamber (1) made in the form of shells of revolution. The channels are grouped up into two systems.

Figure 2:
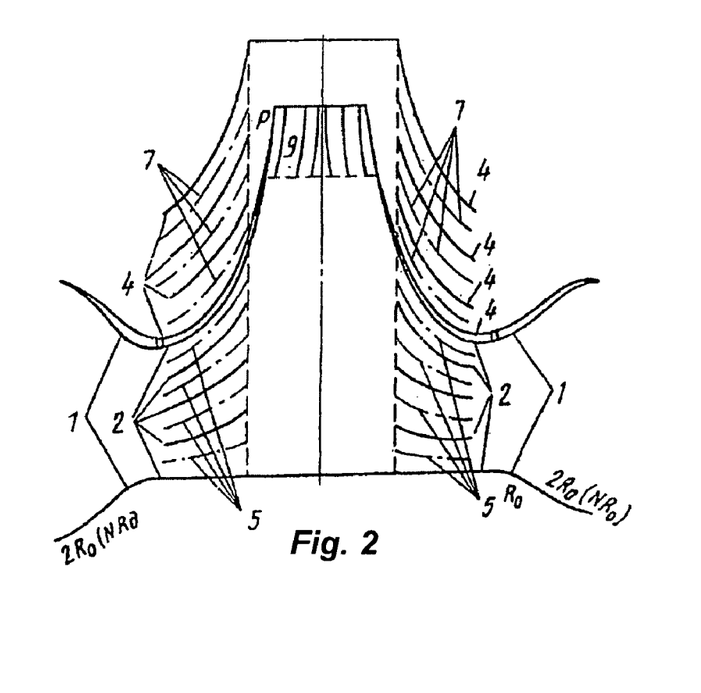
FIG. 2 is a general view of the device with a representation of the shells of the inlet converging chamber, shells of the two systems of channels, turbine in the axial section view, as well as of the channel axes of both systems in coordinates r, z of the cylindrical coordinate system.
Figure 3:
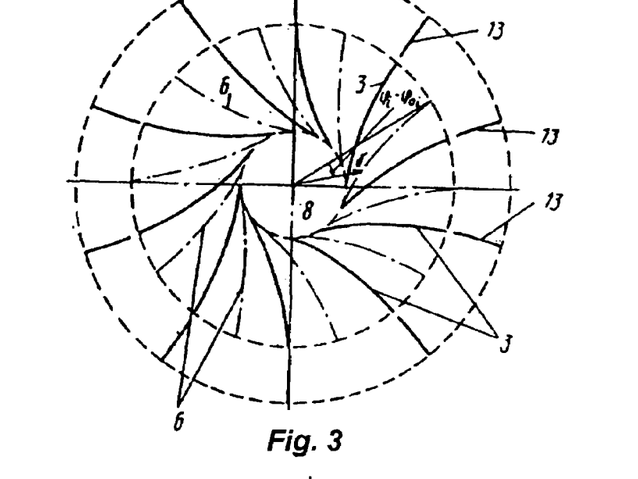
FIG. 3 shows the projections of the axes of the channels and cylindrical surfaces—side walls of the channels on the plane (r, φ) of the cylindrical coordinate system.

The first system of channels is formed by shells of revolution (2) (FIGS. 2, 4, 5) and cylindrical surfaces (3) (see FIG. 3).

The second system of channels is formed in a way similar to that of the first system by shells of revolution (4) (see FIGS. 2, 5) and cylindrical surfaces (3) (see FIG. 3). Axes (5) are the axes of the first system of channels in coordinates r,z (FIG. 2), axes (6) are the axes of the first system of channels in coordinates r,φ (FIG. 3), axes (7) are the axes of the second system of channels in coordinates r,z; 2 (FIG. 2), axes (6) are the axes of the second system of channels in coordinates r,φ (see FIG. 3). Formed inside the device is internal axissymmetric volume (8) (see FIGS. 2, 3, 4, 5).

The proposed device comprises the turbine (9) (FIGS. 2, 4, 6), which is located in the axissymmetric volume, the vanes and shells of the said turbine have a shape that ensures a change of the rotational moment of the vortex flow passing through the turbine.

The upper shell of inlet chamber (1) (FIGS. 2, 5) serves simultaneously as a guide for part of the flow running into the second system of channels.

The device may contain an internal central fairing (10) (FIG. 4), turbine fairing (11) (FIG. 4), the shape of which ensures smooth conjugation to the shape of the central internal fairing, guide vanes (12) of the first system of channels (FIG. 5) and guide vanes (13) of the second system of channels (FIG. 5), the guide vanes being made in the form of movable elements, which automatically narrow the inlet into the first and second systems of channels as the rate of flow exceeds the nominal value.

Figure 4:
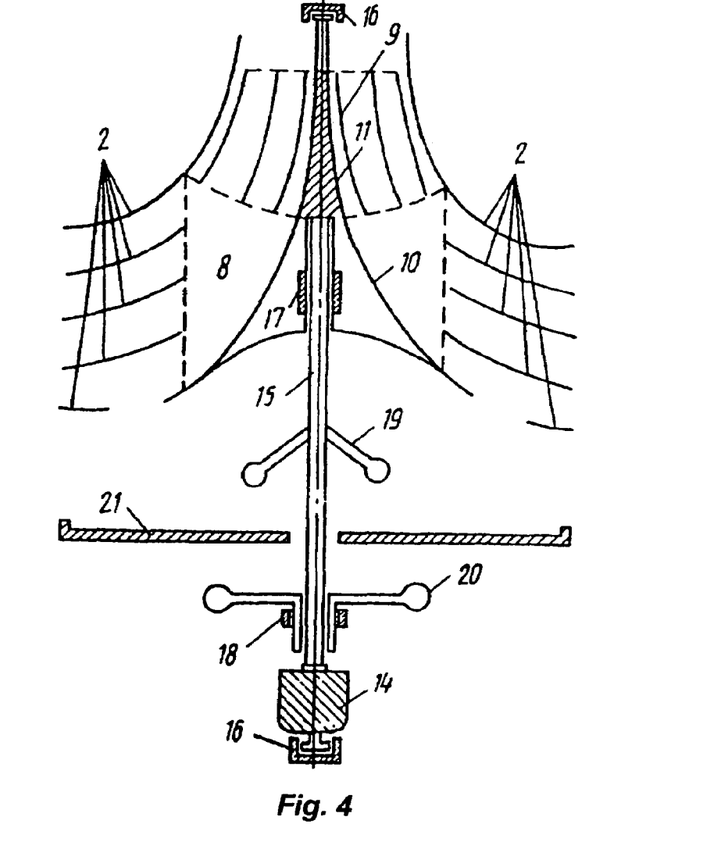
FIG. 4 is a view of the shell of the first system of channels, turbine shells, turbine fairing, central fairing, electric generator, system of floating suspension members, stabiliser of number of revolutions, flywheel, central shaft of the device, thermal accumulator.
Figure 5:
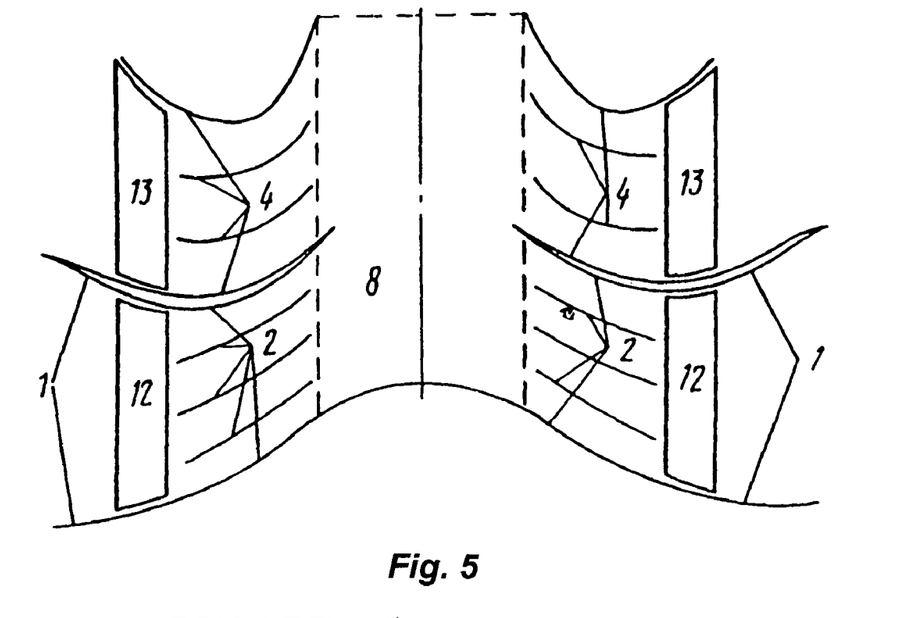
FIG. 5 is a view of the guide vanes of the first and second systems of channels.

The device may be provided with electric generator (14) (FIG. 4, 6), located in the zone of the device either over the turbine, or under the lower shell of the convergent inlet chamber, the rotor of the given generator being connected to turbine (9) (FIGS. 2, 4, 6) through central shaft (15) (FIGS. 4, 6) passing through central fairing (10) (FIG. 4), a system of floating suspension members consisting of magnets (16) (FIGS. 4, 6) and electromagnets (17) and (18) (FIG. 4).

Figure 6:
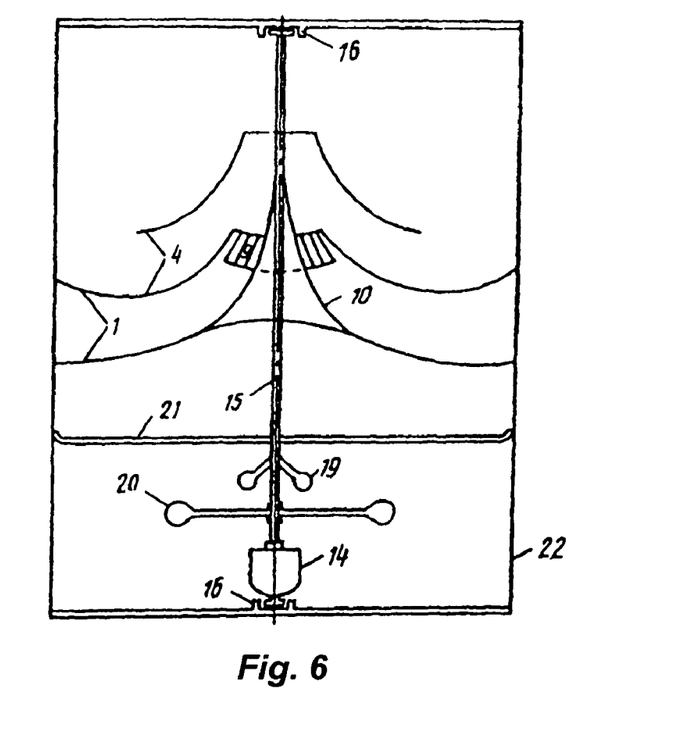
FIG. 6 is a diagram of the supporting structure.

The device may also be provided with a stabiliser (19) of the number of revolutions (see FIGS. 4, 6), which is connected to central shaft (15) of the device and to flywheel (20) (FIGS. 4, 6). The device may include a thermal accumulator (21) (FIGS. 4, 6), which is installed over flywheel (20) (FIGS. 4, 6) or is combined with the latter. The device may be equipped with a supporting structure (22) (FIG. 6), which has at least three supporting points and is rigidly connected to the surface of inlet converging-type chamber (1); the supporting structure serves for the installation and attachment of the mechanical systems, magnetic suspension members and units of the device; it serves also to ensure the required orientation of the entire device in space.

The proposed device, which is presented in FIGS. 2, 3, 4, 5 and 6, operates as follows. As the flow enters inlet chamber (1) (see FIGS. 2, 5, 6) it runs to the first system of channels. In this case, due to the indicated shape of the inlet chamber shells, the flow is quazilaminarised and concentrated; this finds its expression in the concentration of the streamlines of the said flow. The flow is directed into the second system of channels due to the interaction between the flow and the upper shell of the inlet chamber.

In the first system of channels the velocity and mechanical energy of the flow are further concentrated. The choice of axes (5) and (6) of the channels of this system, made in accordance with the above-described relations, practically excludes the formation of harmful secondary flows in each of the channels and, besides, after merging of the flows, running from each channel of the first system of channels, a steady flow (FIG. 6) is formed, the turbulence level of which is minimum, and this results in a very high degree of concentration of the flow velocity. The first system of channels forms a vortex flow (FIG. 2) and directs this flow into the zone of the intervane space inlet of turbine (9) (FIG. 2), thus imparting the required rotational moment to the flow and concentrating its energy for further conversion in the turbine.

In the intervane space of turbine (9) the flow, entering the turbine and being divided therein into separate flows, transfers its moment of momentum to the turbine.

A subsequent concentration of the velocity and mechanical energy of the flow (see FIG. 6) takes also place in the second system of channels, into which the flow is directed. The choice of the axes of the channels of the second system of channels made in accordance with the above-mentioned dependencies, will reduce the formation of harmful secondary vortices and facilitate the efficiency of conversion of pressure into velocity, due to which the pressure will sharply drop as the flows, running out of this system, merge in the zone around and above the outflow area from the turbine, i.e. in the region of flow P (see FIG. 2).

The reduced pressure in the outflow zone resulting from the above pressure drop will promote an increase of the rate of flow through the turbine; in addition, the velocity effect of flow P (see FIG. 2) will dynamically facilitate the evacuation of the waste flow from the outflow area.

The outcoming vortex flow P (see FIG. 2), running from the device into the open space and possessing, due to the second system of channels, a residual twisting, interacts with the external flow moving around the device as in the case when the device is used, for instance, as a wind-driven or hydraulically-driven energy converter and it mates with this flow in the same way as natural vortex flows mate with the generating medium.

When central fairing (10) (FIG. 4) and turbine fairing (11) (FIG. 4) are used, the device operates in a similar way, but in this case its efficiency will increase due to the decrease of the formation of harmful secondary vortices, the said decrease resulting from the shape of the central fairing and turbine fairing.

Guide vanes (12) (FIG. 5) of the first system of channels and guide vanes (13) of the second system of channels (FIG. 5) will automatically narrow the inlet into the first and second systems of channels in case the rate of flow exceeds the nominal value. Electric generator (14) (FIGS. 4, 6) takes up rotation of turbine (9) (FIGS. 2, 4, 6) through central shaft (15) and thus generates electric power.

Floating suspension members (16) ensure smoothness and stability of rotation, and in this case electromagnets (17) and (18) (FIG. 4) prevent the development of dynamic instabilities in the rotation of central shaft (15) thanks to the use of an automatic control system.

Stabiliser (19) of the number of revolutions and flywheel (20) ensure uniform rotation of the rotor of electric generator (14).

Thermal accumulator (21) accumulates the energy of the Sun or of some other sources of heat and stimulates the upward flows of the continuous medium by its heating, directing these flows into the inlet convergent chamber in the form of preliminarily twisted jets of continuous medium.

According to an improvement of this invention, at least a surface area of a component or a device as mentioned above is formed in a manner that vortices are generated. These vortices are contributing or positive vortices and preferably are generated in a boundary layer or boundary layers.

To that end, the continuous medium flow is influenced by a field of forces at least in its wall region within a range of distances yn along the normal from the surface 23, a turn of the velocity vectors of the continuous medium particles is caused repeatedly in space and/or in time by said influence of said forces, said influence is causing said turn in a range of angles α alternately towards the surface 23 and from it away and in a range of angles β alternately to the left and to the right with regard to the direction of the velocity vectors of the continuous medium particles of the near-wall flow, said range yn being from 0.005 to 0.3 times the boundary layer thickness δ, or the equivalent hydraulic diameter of the pressure channel, or the characteristic hydraulic dimension of the near-wall flow; said angle α being between α=0.02 to 0.5 radian; said angle β being between β0.02 to 0.3 radian; the intensity of said influence or the strength of said forces is such that the minimum curvature radius $R_{min}$, of the trajectory of the flow of said particles is from 2 to 30 average distances S along the normal from the streamlined wall to the curved trajectory of the particle, whereas one or both of the belowstanding features a) and/or b) is/are valid:

a) the spatial repetition of said influence being $\lambda\|$=(3 to 30) yn along the direction of the wall flow and $\lambda\perp$=(1 to 10) yn perpendicular to the direction of the wall flow;

b) the time repetition T being from 3 to 30 times the distances yn divided by the average velocity $\underline{v}$ in the boundary or wall layers.

Thereby, the particles may be the elementary (small) volumes (parts, portions) of the continuous medium flow or may be solid particles streaming within the gases, liquids and/or their mixtures.

The near-wall flow of the continuous medium is defined as the flow of the continuous medium in direct neighbourhood (nearness) of the streamlined wall (surface).

The boundary layer thickness δ denotes a distance along the normal from the streamlined wall surface 23 whereby on said distance the flow velocity reaches the value 0.99 of the external potential flow velocity (reference is made to the work of Schlichting G. "Theory of Boundary Layer", Moscow, NAUKA Publishing House, 1974, pp. 712).

The equivalent hydraulic diameter of the pressure channel is defined as the ratio of quadruple channel cross section area to the perimeter of said cross section, see also Schlichting G. "Theory of Boundary Layer", Moscow, NAUKA Publishing House, 1974, pp. 712.

Further, the characteristic hydraulic dimension of the near-wall flow is the distance in the wall region corresponding to the essential change of flow velocity. In this regard, the wall region is a spatial region near the surface 23 in which the flow of the continuous medium is influenced by the presence of the surface 23.

The average distance S along the normal from the streamlined wall to the curved trajectory of the particle is defined as the half sum of the minimum and maximum distances along the normal from the wall to the particle moving along the curved trajectory.

In the case when the averaged velocity vectors turn toward the streamlined surface, this, as a rule, involves a decrease of the pulse and heat transfer from the flowing continuous medium to the surface 23, past which the flow runs, whereas when the said vectors turn from the surface 23, past which the flow runs, the pulse and heat transfer increases. Turns of the velocity vectors to the left or to the right with regard to the direction of the wall flow involve a transfer of the pulse across the said flow and perpendicular with regard to the normal to the surface 23, past which the flow runs.

The turns of the velocity vectors have an influence on the shift of the averaged velocity, i.e. on the derivatives of the absolute averaged velocity value with regard to the directions, which are perpendicular to the averaged velocity vectors. The changed Reynolds stresses also involve changes of the derivatives of the velocity components with regard to the coordinates. These factors, along with the extension of the tubes of flow under conditions of a three-dimensional change of the averaged velocity, result in the formation of various vortex structures, including tornado-like ones. The vortex structures in their turn influence the transfer of the pulse, heat and admixtures.

The distance yn from the wall, within which the field of forces exercises its influence on the continuous medium flow and which involves turns of the continuous medium particle velocity vectors, corresponds to the zone of formation and transformation of coherent large-scale structures, which play an important role in the wall turbulence mechanism. At a turbulent flow of the continuous medium this distance is normally enclosed within the range from 0.005 to 0.3 times the thickness δ of the boundary layer, or equivalent hydraulic diameter of the pressure channel, or characteristic hydraulic dimension of the wall flow.

Control of the continuous medium boundary or wall layer is also achieved by repeated influences on the wall flow correlated in time. The trace of the influence on the wall flow has an extension of the hydrodynamic length scale to approx. 20 yn. In this case a nonmonotonous behaviour of the turbulent flows of the pulse, heat or admixtures may be observed in the trace region, depending on the kind and intensity of the initial influence. Correlation of the repeated influences on the wall flow permits an increase of the desired effects of a single influence on the flow and a decrease of the undesired effects.

The influence on the flow may be exercised by a magnetic field alternating in space and/or in time or jointly by a magnetic field and an electric field, concentrated in the wall region within a range of distances yn=(0.005-0.3)δ.

The influence on the flow may be accomplished by the shape of the streamlined surface alternating as deformable membranes, which are held at the circumference thereof, in space and/or in time, whereby pressure gradients are generated, which undergo changes in value and direction.

The flow may be influenced by blowing the continuous medium in and by sucking it off alternately in space and/or in time in various sections of the surface, past which the flow runs.

Figure 7:
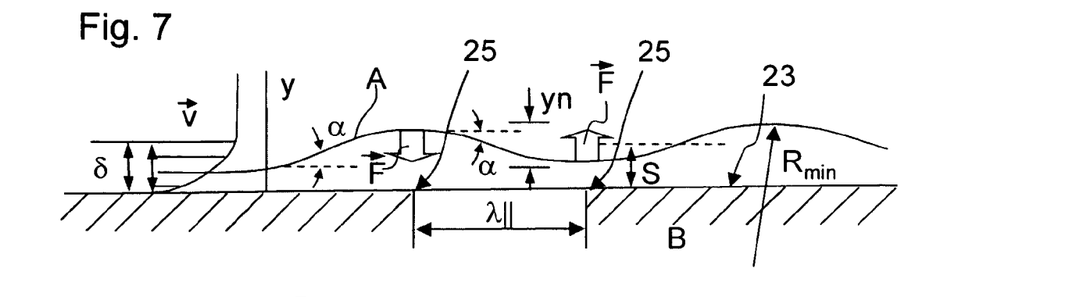
FIG. 7 a cross section of one embodiment of a surface area of the device or a component thereof as extending through a plane defined by the average velocity vector and the normal to the surface in a first, more general inventive embodiment showing also the spatial repetition of the influence along the wall flow direction $\lambda_\parallel$.

Given in FIG. 7 is the diagrammatic representation of the wall flow region with an indication of the velocity profile $\bar{v}$, the trajectory A of the continuous medium particle, the range of distances yn from the wall, around which the flow runs, the boundary layer thickness δ or characteristic hydraulic dimension of the wall flow, angles of turns of the continuous medium particle velocity vectors α towards the streamlined surface B and from it away under the influence of a field of forces F, the average distance S from the streamlined wall to the curved trajectory A of the particle, the minimum curvature radius $R_{min}$, of trajectory A of the continuous medium particle, the spatial repetition of the influence along the wall flow direction $\lambda\|$.

Figure 8:
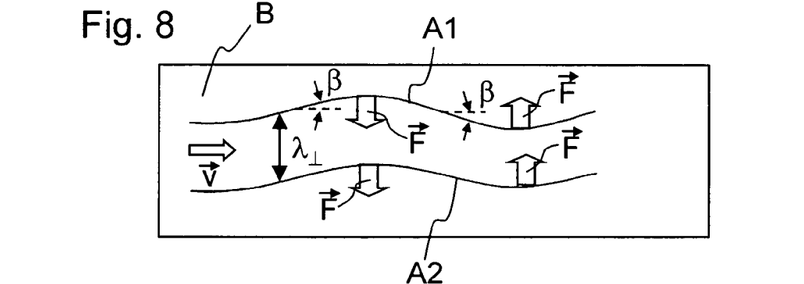
FIG. 8 an elevated view on the surface and the sources of FIG. 7.
Figure 9:
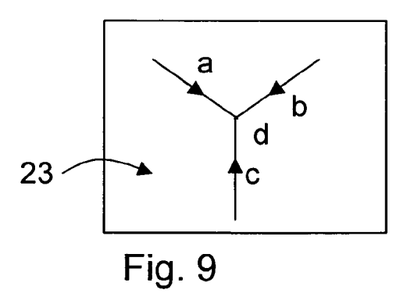
FIGS. 9 to 12: drawings of conductors for the generation of electric and magnetic fields in the vicinity of the surface.
Figure 10:
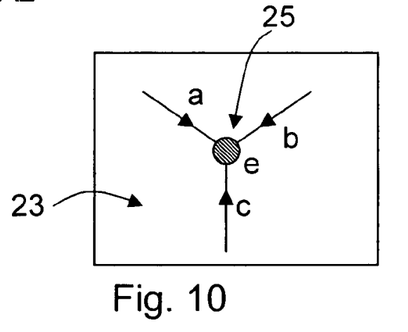

FIG. 8 shows the diagrammatic representation of two trajectories A1 and A2 of the continuous medium particles in the projection on streamlined surface B with an indication of the turn angles β of the continuous medium particle velocity vectors to the left and to the right with regard to the wall flow direction $\underline{v}$ under the influence of the field of forces F, and spatial repetition of the influence across the direction of wall flow $\lambda\|$.

Figure 13:
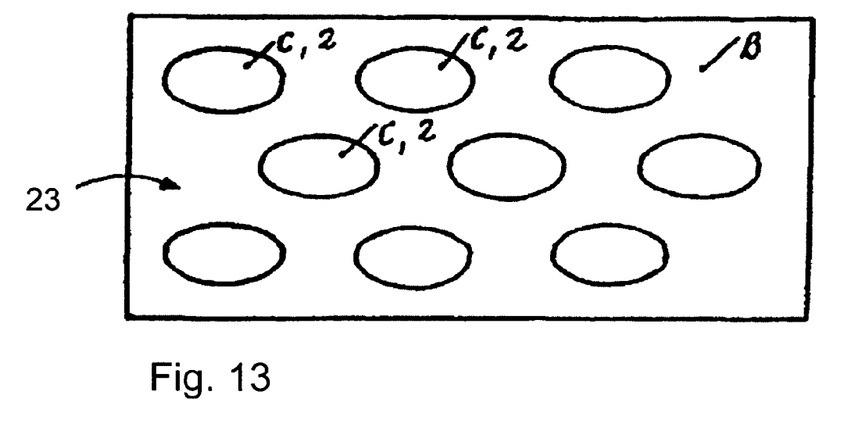
FIGS. 13 and 14: elevational views on the surface containing as sources of influence deformable surface elements comprising membranes.
Figure 14:
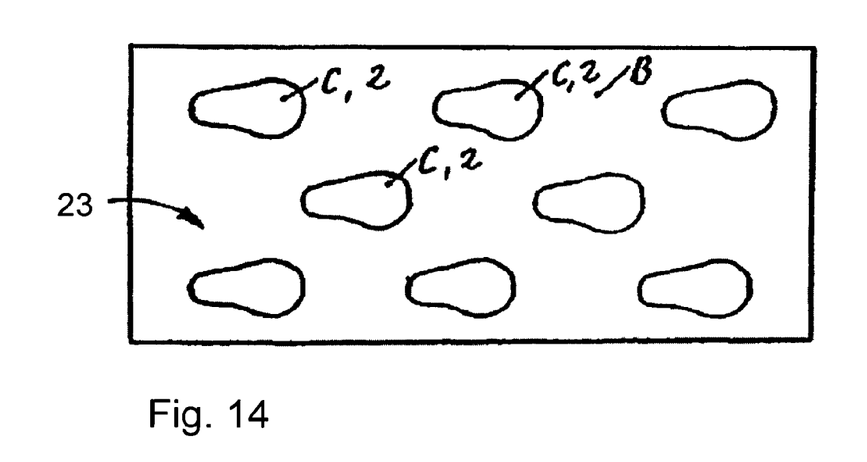

Shown in FIGS. 13 and 14 are the diagrammatic representations of regions C of streamlined surface B, the shape of which alternates in space and/or in time. The surfaces C may be including elastic membranes which are sealedly held at the circumference thereof and energized by a pressure transmitting fluid on the other side of the surface 1. The pressure of the fluid may be controlled for all of the membranes or separately by means well known for a person skilled in the art.

Figure 15:
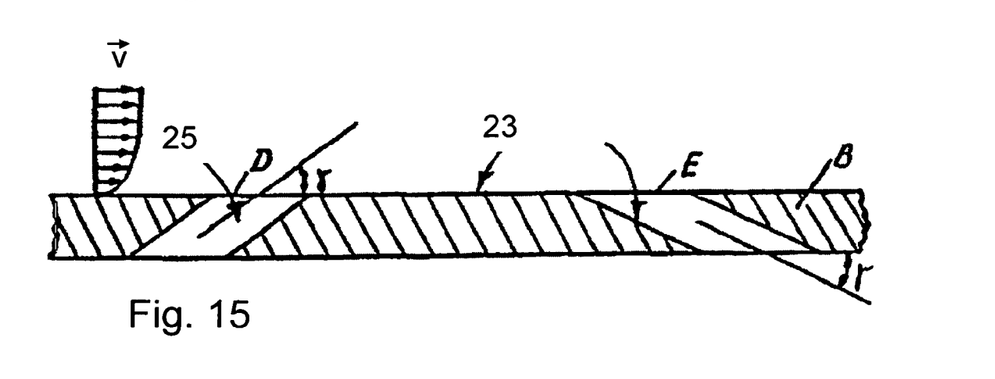
FIG. 15 a cross section through a surface containing as source of influence through holes for injecting and sucking off of parts of the flowing medium.

Given in FIG. 15 is the diagrammatic representation of streamlined surface B with holes D for blowing in of the continuous medium and holes E for sucking off this medium.

It has to be mentioned that the method of controlling the boundary or wall layer of the continuous medium may be realized in the following way. As it is shown in FIGS. 7 and 8 the continuous medium flow is influenced by the field of forces F at least in its wall region within a range of distances yn along the normal from the streamlined surface B, this range being from 0.005 to 0.3 of the boundary layer thickness δ, or equivalent hydraulic diameter of the pressure channel, or characteristic hydraulic dimension of the wall flow; by means of such an influence the vectors of continuous medium particle velocities are caused to turn alternately in space and/or in time through angles α=0.02 to 0.5 radian to the streamlined surface or from it and through angles β☐=0.02 to 0.3 radian to the left or to the right with regard to the direction of the wall flow v or $\underline{v}$ of the continuous medium, and in this case the influence intensity is such that the minimum curvature radius $R_{min}$, of trajectory A of the continuous medium particles, which are under the influence of the field of forces F within the range of the indicated distances from the wall is from 2 to 30 average distances S along the normal from the streamlined surface B to the particle curved trajectory A, whereas the spatial repetition of the influence is $\lambda\|$=(3 to 30)yn along the direction of flow, $\lambda\perp$=(1 to 10) yn across the direction of flow, time repetition T is from 3 to 30 distances yn divided by the average velocity $\underline{v}$ in the boundary or wall layers, and this provides for the formation of secondary tornado-like vortex flows, which form the structure of the boundary or wall layer, and this structure determines the level of turbulence, transfer of the pulse, heat and admixtures. The created three-dimensional tornado-like structures are characterized by the nonzero helicity v·rot v≠0.

In accordance with the modern knowledge, the vortex flow regions with the nonzero helicity, such as, for example, tornado-like structures, lead to the effects of the anomalous energy transfer along the turbulence spectrum, to the negative turbulent viscosity and to the disturbance of the Reynolds analogy in the direction of the heat transfer. So tornado-like vortex flows control and form the boundary or wall flow structure and create the helicity turbulence.

The flow is influenced by means of devices, the diagrammatic representations of which are given in FIGS. 9 to 15. To this end, an electric current is passed via conductors a, b, c, d, e, f, g (FIGS. 9 to 12), and electric potentials are applied to them (in particular to conductor h). In this case the current, passing through the conductors, creates a magnetic field, which influences the wall flow due to the electric current, which is induced in the wall layer of the continuous medium, including the influence due to the difference of the electric potentials. The originating force F=σ☐[E×B+B×(B×v)] involves a turn of the continuous medium particle velocity vectors in accordance with the above-described method. The electric current conductors may have various configurations, in particular, they may be of the linear or area nature. In this case at least one of the dimensions of the conductors is from 0.005 to 0.3 δ.

The flow is influenced by concavities and/or convexities c of this or that shape (FIGS. 13, 14), and in this case the depth (height) of the concavity (convexity) is from 0.005 to 0.3 δ, the minimum curvature radius $R_{min}$ of the concavity (convexity) in its main part is from 0.1 to 1.0 δ.

Figure 11:
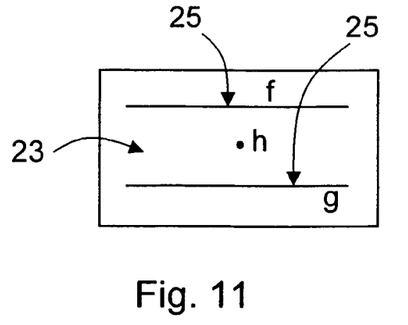
Figure 12:
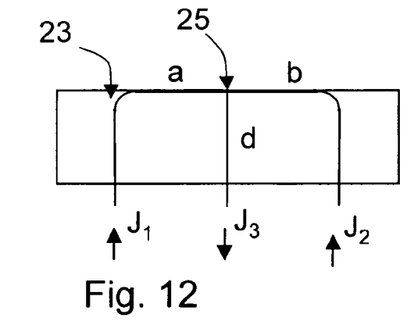

The influence on the flows accomplished by movable membranes secured at the perimeters of holes of this or that shape (the diagrammatic representation of membrane C is shown in FIGS. 11 and 12). In the given case the diameter of the holes is from 0.01 to 0.6 δ, whereas the displacement of the central part of the membrane is from 0.005 to 0.3 δ.

The influence is accomplished by blowing the continuous medium in the holes and by sucking it off through the holes. In this case the hole diameter is from 0.005 to 0.1 δ, and the holes are arranged at a pitch of 2 to 10 hole diameters, whereas the velocity vector of the blown in or sucked off continuous medium forms an angle to the streamlined surface equal to a value of 0.1 to 1.0 radian.

The operation of the devices, provided with concavities, convexities, membranes, blowing in and sucking off holes, is obvious. As the flow runs past the concavities, convexities, membranes, holes, a field of pressure gradients is formed and there gradients cause the vectors of the continuous medium particle velocities to turn in the wall region of the flow in accordance with the above-described method.

A very simple trial and error technique may be deployed to test and optimize operation of the device.

For a given surface the velocity vectors of the flow should be measured, which is known for a person skilled in the art, and may be performed by well known techniques as f.i. laser anemometry, measuring of heat exchange, visual recording of particles located within the flow, and many others.

At first a source 25 of influence should be located in the vicinity of or in the surface 23; and testing of the flow structure provides information of the directional change of the velocity vector v, i.e. also of the average velocity vector $\underline{v}$, and is providing information about the distribution of angles of the velocity of the flow in the direction of the normal and in a plane extending parallel to the surface.

Based on the obtained results the intensity of the employed fields, i.e. the strength of the induced forces or the depth of deformation, may be amended, essentially in view of a distribution in the direction of the normal to the surface 23.

Based on the measured lateral distribution of flow velocity vectors essentially the lateral dimensions of the first source 25 may be adapted and optimized.

After optimization of the first source 25 the second and further sources may be located at a distance as described above. Thus a grid of adapted sources may be obtained stepwise for substantially any surfaces of any shape and for basically all technically relevant devices. The sources 25 may also be randomly or statistically distributed within the defined ranges as described above.

It is obvious that there are different local velocities at different places of a surface 23 within the device for conversion of the energy of medium flows. Consequently, the resulting positions of the sources 25 will vary in accordance.

Furthermore, it is lying within the scope of the invention not only to use a field of sources 25 which are placed at the respective distances for the respective as described above, but to use a very a dense field of sources 25, e.g. magnetic coils, electric potential plates, surface deformations by membranes, and/or ports for injecting and sucking off, which are not all energized at the same time. By omitting the energization of the respective misplaced sources 25, it is possible to control the local influence also for different velocities, respectively.

According to a further improvement of this invention, at least a surface area of the inventive device or a component thereof comprises a three-dimensional relief causing vortices to be generated in a continuous medium flow running past the surface area. As in the embodiment described heretofore, these vortices are contributing or positive vortices.

Figure 16:
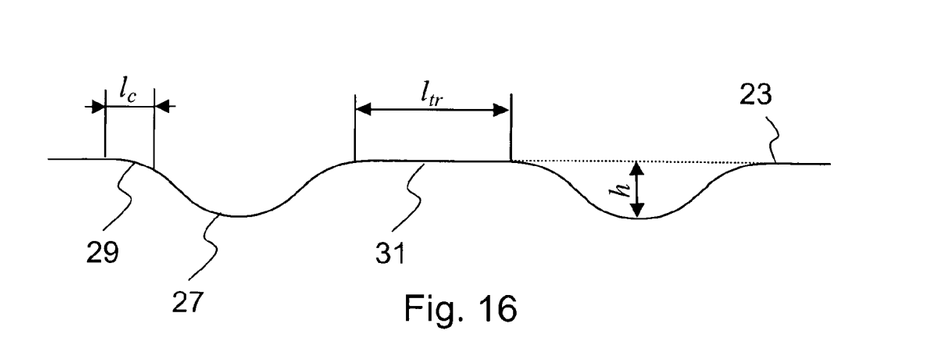
FIG. 16 a concavity relief section across a surface area according to a further embodiment of the device.
Figure 17:
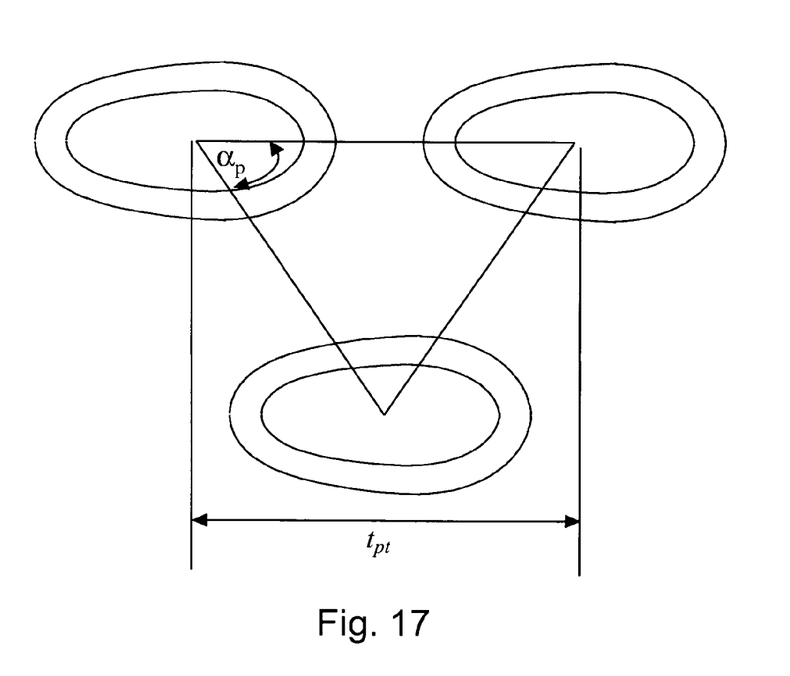
FIG. 17 the top view on surface of FIG. 16.

Reference is made to FIGS. 16 and 17, illustrating the further improvement. According to this improvement, the device comprises a surface area 23, which ensures control of the process in the boundary and near wall layers of continuous medium flows and which is provided with a three-dimensional relief.

The three-dimensional relief is made in the shape of concavities or convexities 27,
curvature areas 29 and
transition areas 31, whereby any section of said concavities 27 or convexities along the surface area 23 has the shape of a smooth closed line, described by the relation:

$$r(\varphi, z) = \left(\frac{z}{h}\right)^k \left[ r(h, 0) - \frac{l_c}{2} + \Delta r\left(\frac{\varphi}{180} - \frac{1}{4\pi}\sin\frac{4\pi\varphi}{180}\right) + A_1\Delta r\left(\sin\frac{\pi\varphi}{180} - \frac{1}{3}\sin\frac{3\pi\varphi}{180}\right) + A_2\Delta r\left(\sin\frac{2\pi\varphi}{180} - \frac{1}{2}\sin\frac{4\pi\varphi}{180}\right) \right],$$

where:
$r(\varphi,z)$ is the section radius in the direction of angle $\varphi$ counted from the line interconnecting the centers of the adjacent convacities or convexities, or from any line, which lies in the indicated section;
z is the section height over the lowermost point of the concavity or section distance from the uppermost point of the convexity;
$r(h,0)$ is the radius of the concavity or convexity section in the direction of angle $\varphi=0°$;
$\Delta r(h,0)=r(h,180)-r(h,0)$ is the difference between the radii of the concavity or convexity section in the direction of angles $\varphi=180°$ and $\varphi=0°$;
$l_c$ is the dimension of the curvature area projected onto a plane extending parallel to the streamlined surface;
$k=0.3$ to $0.7$ is a coefficient;
$-1<A_1<1$ is a coefficient of the shape of the section;
$-1<A_2<1$ is a coefficient of the shape of the section, and whereby
the depth of the concavities 27 or convexities h is 0.005 to 0.3 of the thickness of the boundary layer or of the equivalent hydraulic diameter of the duct,
the curvature area 29 of the concavities or convexities has, in a plane perpendicular to the surface, a common tangent with the transition area 31, which is located between the adjacent concavities 27 or convexities and which is made in the shape of a bicurvature surface with radii $R_{c1}$, $R_{c2}$ meeting the following relations:

$|R_{c1}|\geq 3h$ and $|R_{c2}|\geq 3h$ whereby
the dimension D of the concavities 27 or convexities along the streamlined surface is $D=(2 \text{ to } 40)h,$ the dimension $l_c$ of the curvature area 29 along the streamlined surface is $l_c=(0.05 \text{ to } 0.3)D,$ whereas the dimension $l_{tr}$ of the transition area (31) along the line interconnecting the centers of the adjacent concavities 27 or convexities is $l_{tr}=(0.05 \text{ to } 3)D.$ The surface area 23 may be any surface part of the device adjacent to the continuous flow medium. Advantageously, the concavities or convexities may be located in the vertices of parallelograms, the lengths $t_{pt}$ of the sides of which are within the range of 1.05 to 4 dimensions of the concavities 27 or convexities and the vertex angle $\alpha_p$ is 20° to 90°.

The relations as set forth above, which characterize the indicated relief of the concavities and convexities, have been obtained as a result of processing thermophysical measurements.

The convexities relief section across the streamlined surface 23 is similar to the relief section of the concavities shown in FIG. 16.

The streamlined surface 23 consists of concavities 27 (convexities), which include curvature areas 29 and transition areas 31.

When a continuous medium flow runs past a surface provided with concavities (convexities) containing elements of the indicated dimensions in the near wall area at a distance of 0.005 to 0.3 thickness of the boundary layer or an equivalent hydraulic diameter of the duct, three-dimensional velocity and pressure fields of the continuous medium are formed. The three-dimensional features of the velocity and pressure fields alongside with the inertia forces, which originate in the near wall layers of the flow due to running of the flow past the convexities 27 or concavities, result in the generation of Goertler vortices and other large-scale vortex structures, including tornado-like ones. The indicated ranges of the dimensions of the concavity or convexity elements ensure generation of vortex structures resulting in their self-organisation, which is favourable from the point of view of the intensification of the heat-and-mass transfer and of the other processes, which take place in the boundary or near wall layers of the continuous medium flow.

The smooth shapes of the three-dimensional relief of concavities or convexities, the presence of a transition area in the shape of a bicurvature surface between the concavities 27 or convexities ensure, according to proposed invention, the dynamical properties of the large-scale vortex structures and the possibility of their alignment with the main flow. This has found its expression in the lagging increase of the hydraulic resistance as compared with the increase of the heat or mass transfer intensity, and in some cases there is even a decrease of the hydraulic resistance as compared with the hydraulic resistance of smooth surfaces.

In addition, the realisation of the proposed device results in a visible decrease of deposition of foreign impurities from the heat carrier onto the streamlined surface. This fact is connected with the directness of the generation of Goertler- and tornado-like vortex structures, which increase the transfer of the mass, the admixtures included, from the wall away into the flow core.

According to the improvement, the smoothness of the streamlined relief also ensures an increased corrosion resistance of the streamlined surface when continuous media are used, which usually involve corrosion processes.

According to data of experiments, the peculiarities of the mass transfer, originating due to the generation of large-scale vortex structures, decrease the probability of the origination of electrochemical processes on the surface of the inventive device provided with a relief as described herein.

The use of a three-dimensional concavity or convexity relief of the indicated parameters results in a noticeable increase of the critical heat flows within a wide range of liquid pressure, mass velocity of line heal carrier and a relative vapour content. The shift of the critical heat transfer towards high thermal loads as the flow runs past the surface, provided with the indicated relief, is caused by the formation of a heated surface of large-scale self-organising structures, tornado-like structures included, by means of which the vapour bubbles are evacuated from the area surrounding the concavity or convexity and taken away from the user wall layer into the flow core. Favourable to this is also the smoothness and the three-dimensional features of the relief, since they contribute to the change of the directions of the orientation and twisting of the vortex structures.

The invention claimed is:

1. A method of conversion of the energy of continuous medium flows with a turbine, comprising:
    directing flow which is to be converted into a conversion system which has a surface or a part of a surface generating vortices wherein the continuous medium flow is influenced by a field of forces in its wall region of the surface or part of the surface within a range of distances yn along the normal from the surface or the part of the surface;
    a turn of the velocity vectors of the continuous medium particles is caused repeatedly in space and/or in time by said influence of said forces, said influence is causing said turn in a range of angles α alternately towards the surface or the part of the surface and from the surface or the part of the surface away and in a range of angles β alternately to the left and to the right with regard to the direction of the velocity vectors of the continuous medium particles of the near-wall flow;
    said range yn being from 0.005 to 0.3 times the boundary layer thickness δ, or being from 0.005 to 0.3 times the characteristic hydraulic dimension of the near-wall flow;
    said angle α being between α=0.02 to 0.5 radian;
    said angle β being between β=0.02 to 0.3 radian;
    the intensity of said influence or the strength of said forces is such that the minimum curvature radius $R_{min}$, of the trajectory of the flow of said particles is from 2 to 30 average distances S along the normal from the surface or the part of the surface to the curved trajectory of the particles;
    wherein one or both of the below standing features a) and/or b) is/are valid a) the spatial repetition of said influence being λΠ=(3 to 30) yn along the direction of the wall flow and λ⊥=(1 to 10) yn perpendicular to the direction of the wall flow, b) the time repetition T being from 3 to 30 times the distances yn divided by the average velocity v in the boundary or wall layers,
    directing the converted flow into an internal axis symmetric volume of the conversion system along two systems of trajectories converging towards the axis of symmetry of said volume,
    the first of said systems forms a vortex flow just in front of a zone of conversion of the rotational moment so that the mechanical energy and rotational moment is concentrated in the axis symmetric volume and the mechanical energy and rotational moment is converted in the same volume by said turbine placed within said zone of conversion of the rotational moment and mechanical energy, whereas the second system of trajectories forms a flow with a reduced pressure, said pressure reduction ensuring evacuation of the continuous medium, which flows out of the zone of conversion of the energy and rotational moment;
    the first system of trajectories will at first fill the space, which is limited by two surfaces of revolution, and then the first system of trajectories assumes the form of helical lines;
    wherein the flow is swirled up in the second system of trajectories.

2. The method of claim 1, wherein the surface or the part of the surface is an internal surface of a device for converting the energy of continuous medium flows.

3. A device for conversion of the energy of medium flows, comprising:
    a converging inlet chamber and two systems of channels wherein a surface or a part of a surface of said converging inlet chamber and two systems of channels generate vortices, wherein the continuous medium flow is influenced by a field of forces in its wall region of the surface or the part of the surface within a range of distances yn along the normal from the surface or the part of the surface;

a turn of the velocity vectors of the continuous medium particles is caused repeatedly in space and/or in time by said influence of said forces, said influence is causing said turn in a range of angles α alternately towards the surface or the part of the surface and from the surface or the part of the surface away and in a range of angles β alternately to the left and to the right with regard to the direction of the velocity vectors of the continuous medium particles of the near-wall flow;

said range yn being from 0.005 to 0.3 times the boundary layer thickness δ, or said range yn being from 0.005 to 0.3 times the characteristic hydraulic dimension of the near-wall flow;

said angle α being between α=0.02 to 0.5 radian;

said angle β being between β=0.02 to 0.3 radian;

the intensity of said influence or the strength of said forces is such that the minimum curvature radius $R_{min}$, of the trajectory of the flow of said particles is from 2 to 30 average distances S along the normal from the surface or the part of the surface to the curved trajectory of the particles, whereas one or both of the below standing features a) and/or b) is/are valid a) the spatial repetition of said influence being λII=(3 to 30) yn along the direction of the wall flow and λ⊥(1 to 10) yn perpendicular to the direction of the wall flow, b) the time repetition T being from 3 to 30 times the distances yn divided by the average velocity v in the boundary or wall layers, whereby said two systems of channels are arranged symmetrically with regard to a central shaft of the device, the first of said systems comprising axes in the form of helical lines;

said device further comprising a turbine with a fairing, which smoothly conjugates a central internal fairing, an electric power generator, connected to the turbine by means of the central shaft passing through the central fairing, and a supporting structure; wherein the second system of channels comprises axes in the form of helical lines.

4. The device of claim 3, wherein the surface or the part of the surface is an internal surface or a part of a surface of the internal surface.

5. The device of claim 3, wherein the central internal fairing has a shape described by dependence:

$Z_\mu = C_\mu r^2$, where
$C_\mu = (1-4)10^{-4} Z R^2$;
Z, r—cylindrical coordinates;
Z—height of axis symmetric volume of the device;
R—radius of axis symmetric volume of the device.

6. The device of claim 3, wherein the systems of channels are provided with guide vanes in the form of movable elements, which automatically narrow an inlet into the first and second systems of channels as the rate of flow exceeds a nominal value.

7. The device of claim 3, wherein the electric generator is arranged in any zone of the device, either over the turbine or under a lower shell of the inlet converging chamber.

8. The device of claim 3, further comprising a thermal accumulator, which uses the energy of the sun or the energy of other sources of heat; installed over a flywheel and serves for heating and stimulation of the continuous medium upward flows, the surface of said thermal accumulator being used for directing the upward flow into the inlet converging chamber in the shape of preliminarily swirled jets of the continuous medium.

9. The device of claim 3, further comprising a surface area, whereby said surface area ensures control of the process in the boundary and near wall layers of continuous medium flows and which is provided with a three-dimensional relief comprising concavities or convexities, curvature areas, and transition areas, whereby any section of said concavities or convexities along the surface has the shape of a smooth closed line, described by the relation:

$$r(\varphi, z) = \left(\frac{z}{h}\right)^k \left[ r(h, 0) = \frac{l_c}{2} + \Delta r\left(\frac{\varphi}{180} - \frac{1}{4\pi}\sin\frac{4\pi\varphi}{180}\right) + A_1\Delta r\left(\sin\frac{\pi\varphi}{180} - \frac{1}{3}\sin\frac{3\pi\varphi}{180}\right) + A_2\Delta r\left(\sin\frac{2\pi\varphi}{180} - \frac{1}{2}\sin\frac{4\pi\varphi}{180}\right) \right],$$

where:

r(φ,z) is the section radius in the direction of angle φ counted from the line interconnecting the centers of the adjacent concavities or convexities, or from any line, which lies in the indicated section;

z is the section height over the lowermost point of the concavity or section distance from the uppermost point of the convexity;

r(h,0) is the radius of the concavity or convexity section in the direction of angle Φ=0°;

Δr(h,0)=r(h,180)−r(h,0) is the difference between the radii of the concavity or convexity section in the direction of angles φ=180° and φ=0°;

$I_c$ is the dimension of the curvature area projected onto a plane extending parallel to the streamlined surface;

k=0.3 to 0.7 is a coefficient;

1<$A_1$<1 is a coefficient of the shape of the section;

1<$A_2$<1 is a coefficient of the shape of the section;

the depth of the concavities or convexities h is 0.005 to 0.3 of the thickness of the boundary layer or of the equivalent hydraulic diameter of the duct;

the curvature area of the concavities or convexities has, in a plane perpendicular to the surface, a common tangent with the transition area, which is located between the adjacent concavities or convexities and which is in the shape of a bicurvature surface with radii $R_{c1}$, $R_{c2}$ meeting the following relations:

$|R_{c1}| \geq 3h$ and $|R_{c2}| \geq 3h$, whereby the dimension D of the concavities or convexities along the streamlined surface is $D = (2$ to $40)h$, the dimension $I_c$ of the curvature area along the streamlined surface is $I_c = (0.05$ to $0.3)D$, whereas the dimension $I_{tr}$ of the transition area along the line interconnecting the centers of the adjacent concavities or convexities is $I_{tr} = (0.05$ to $3)D$.

10. The device of claim 9, wherein the centers of the concavities or convexities are located in the vortices of a parallelogram, the lengths $t_{pt}$ of the sides of which are within the range of 1.05 to 4 dimensions of the concavities or convexities and the vertex angle is $\alpha_p = 20$ to 90 degrees.

* * * * *